United States Patent
Lin et al.

(10) Patent No.: US 11,028,109 B2
(45) Date of Patent: Jun. 8, 2021

(54) PHOSPHORUS-CONTAINING COMPOUND, MANUFACTURING METHOD THEREOF AND FLAME-RETARDANT THERMOSET

(71) Applicant: NATIONAL CHUNGHSING UNIVERSITY, Taichung (TW)

(72) Inventors: Ching-Hsuan Lin, Taichung (TW); Yu-Hsiang Lin, Tainan (TW); Po-Chun Yang, New Taipei (TW); Yi-Ning Chiang, Taichung (TW); Wen-Chang Chen, Taipei (TW)

(73) Assignee: National Chunghsing University, Taichung (TW)

( * ) Notice: Subject to any disclaimer, the term of this patent is extended or adjusted under 35 U.S.C. 154(b) by 58 days.

(21) Appl. No.: 16/417,954

(22) Filed: May 21, 2019

(65) Prior Publication Data
US 2019/0352317 A1   Nov. 21, 2019

(30) Foreign Application Priority Data
May 21, 2018   (TW) ................. 107117271

(51) Int. Cl.
  *C08L 23/12*   (2006.01)
  *C07F 9/32*   (2006.01)
  *C08G 59/14*   (2006.01)

(52) U.S. Cl.
  CPC ........ *C07F 9/3282* (2013.01); *C08G 59/1488* (2013.01)

(58) Field of Classification Search
  CPC .................................... C07F 9/657172
  See application file for complete search history.

(56) References Cited

U.S. PATENT DOCUMENTS

| | | | | |
|---|---|---|---|---|
| 6,797,821 B2* | 9/2004 | Wang | ................. | C08G 59/4021 525/507 |
| 8,822,723 B2* | 9/2014 | Su | ..................... | C07F 9/657172 564/16 |
| 2008/0241578 A1* | 10/2008 | Lin | ........................ | C09K 21/12 428/626 |
| 2012/0149932 A1 | 6/2012 | Gan | | |
| 2014/0249253 A1* | 9/2014 | Worku | ................. | C08K 5/5313 523/451 |
| 2015/0203759 A1* | 7/2015 | Zich | .................. | C07F 9/657154 544/195 |

FOREIGN PATENT DOCUMENTS

| | | | | |
|---|---|---|---|---|
| TW | 201100443 A | * | 1/2011 | |
| TW | 201100444 A | * | 1/2011 | |
| TW | 201925158 A | * | 7/2019 | |

OTHER PUBLICATIONS

Machine Translation of TW 201100443 (Year: 2020).*

* cited by examiner

*Primary Examiner* — Michael M Dollinger
(74) *Attorney, Agent, or Firm* — Muncy, Geissler, Olds & Lowe, P.C.

(57) ABSTRACT

The present disclosure provides a phosphorus-containing compound, which includes a structure represented by formula (I). Formula (I) is defined as in the specification. The present disclosure further provides a flame-retardant thermoset made by the phosphorus-containing compound including the structure represented by formula (I). The present disclosure also provides a manufacturing method for the phosphorus-containing compound.

9 Claims, 9 Drawing Sheets

100

```
┌─────────────────────────────────────────────┐
│   a hydroxyl group-containing compound is   │──── 110
│              synthesized                     │
└─────────────────────────────────────────────┘
                      ⇩
┌─────────────────────────────────────────────┐
│   an acid-catalyzed reaction is performed    │──── 120
└─────────────────────────────────────────────┘
```

PHOSPHORUS-CONTAINING COMPOUND, MANUFACTURING METHOD THEREOF AND FLAME-RETARDANT THERMOSET

RELATED APPLICATIONS

This application claims priority to Taiwan Application Serial Number 107117271, filed May 21, 2018, which is herein incorporated by reference.

BACKGROUND

Technical Field

The present disclosure relates to a phosphorus-containing compound, a manufacturing method thereof and a flame-retardant thermoset. More particularly, the present disclosure relates to a phosphorus-containing compound having a phenolic group or an acrylic functional group, a manufacturing method thereof and a flame-retardant thermoset.

Description of Related Art

The electronic materials are often made of the halogen-containing organic materials now, such as bromine-containing epoxy resins, which have the flame retardant properties. However, the bromine-containing epoxy resins will release hydrogen bromide, dibenzo-p-dioxin and dibenzo-furan with corrosive and toxic during the combustion.

In addition to the use of the halogen-containing organic materials, another method of flame retardant is coating the non-flammable outer layer outside the plastic. Nowadays, among the materials used for the outer layer, the flame retardant efficiency of an alkyne-containing compound and a phosphorus-containing compound are the best. Phosphorus-containing compounds known for flame retardant include DOPOHQ and DRP. However, whether DOPOHQ or DRP has a high cost of raw materials, which is unfavorable for commercial applications.

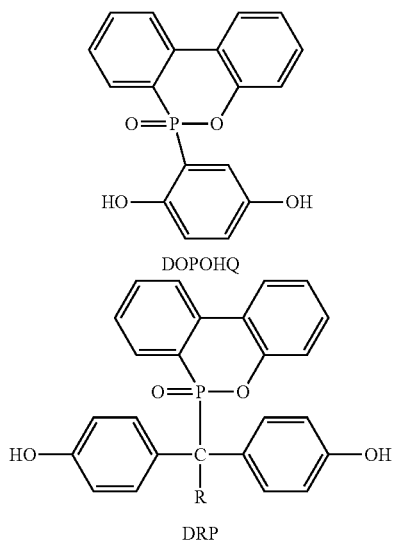

SUMMARY

According to one aspect of the present disclosure, a phosphorus-containing compound is provided. The phosphorus-containing compound includes a structure represented by formula (I):

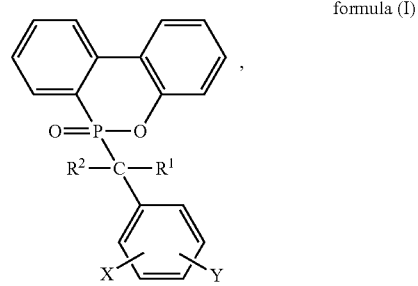

formula (I)

wherein $R^1$ and $R^2$ are each independently a hydrogen atom, an alkyl group of 1 to 6 carbon atoms, a trifluoromethyl group, an unsubstituted phenyl group, a substituted phenyl group, an unsubstituted naphthyl group or a substituted naphthyl group, X and Y are each independently —OH or a group represented by formula (MA):

formula (MA)

wherein $R^3$ is the hydrogen atom or the alkyl group of 1 to 6 carbon atoms.

According to another aspect of the present disclosure, a flame-retardant thermoset is provided. The flame-retardant thermoset is made by the phosphorus-containing compound according to the aforementioned aspect.

According to further another aspect of the present disclosure, a manufacturing method for a phosphorus-containing compound includes steps as follows. A hydroxyl group-containing compound is synthesized, wherein an organic phosphorus-containing compound represented by formula (i) is reacted with a carbonyl group-containing compound represented by formula (ii) to obtain a hydroxyl group-containing compound represented by formula (iii):

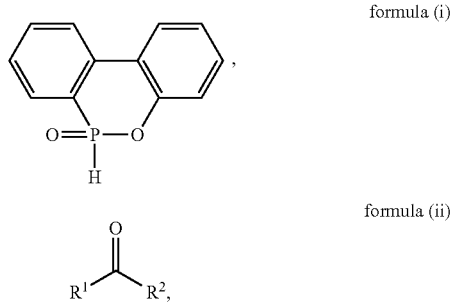

formula (i)

formula (ii)

-continued

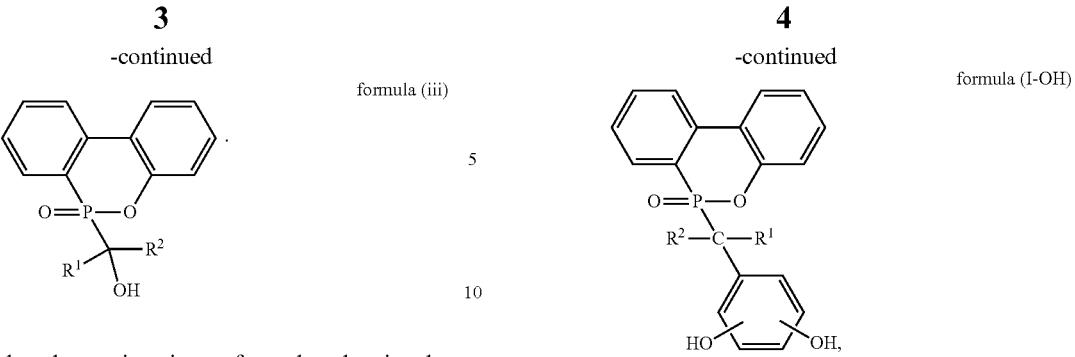
formula (iii)

An acid-catalyzed reaction is performed, wherein the hydroxyl group-containing compound represented by formula (iii) is reacted with benzenediol at a catalysis of an acid catalyst to obtain a phosphorus-containing compound represented by formula (I—OH):

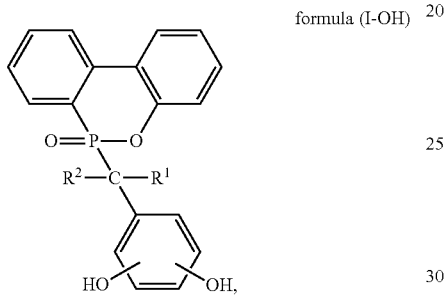
formula (I-OH)

wherein $R^1$ and $R^2$ are each independently a hydrogen atom, an alkyl group of 1 to 6 carbon atoms, a trifluoromethyl group, an unsubstituted phenyl group, a substituted phenyl group, an unsubstituted naphthyl group or a substituted naphthyl group.

According to still another aspect of the present disclosure, a manufacturing method for a phosphorus-containing compound includes steps as follows. An acid-catalyzed reaction is performed, wherein an organic phosphorus-containing compound represented by formula (i) and a carbonyl group-containing compound represented by formula (ii) are reacted with benzenediol at a catalysis of an acid catalyst to obtain a phosphorus-containing compound represented by formula (I—OH):

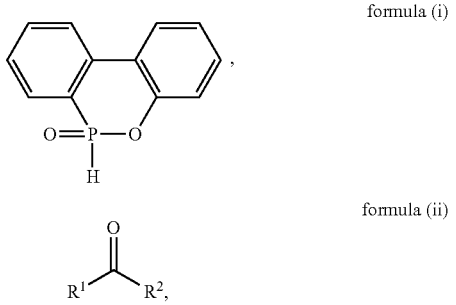
formula (i)

formula (ii)

wherein $R^1$ and $R^2$ are each independently a hydrogen atom, an alkyl group of 1 to 6 carbon atoms, a trifluoromethyl group, an unsubstituted phenyl group, a substituted phenyl group, an unsubstituted naphthyl group or a substituted naphthyl group.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
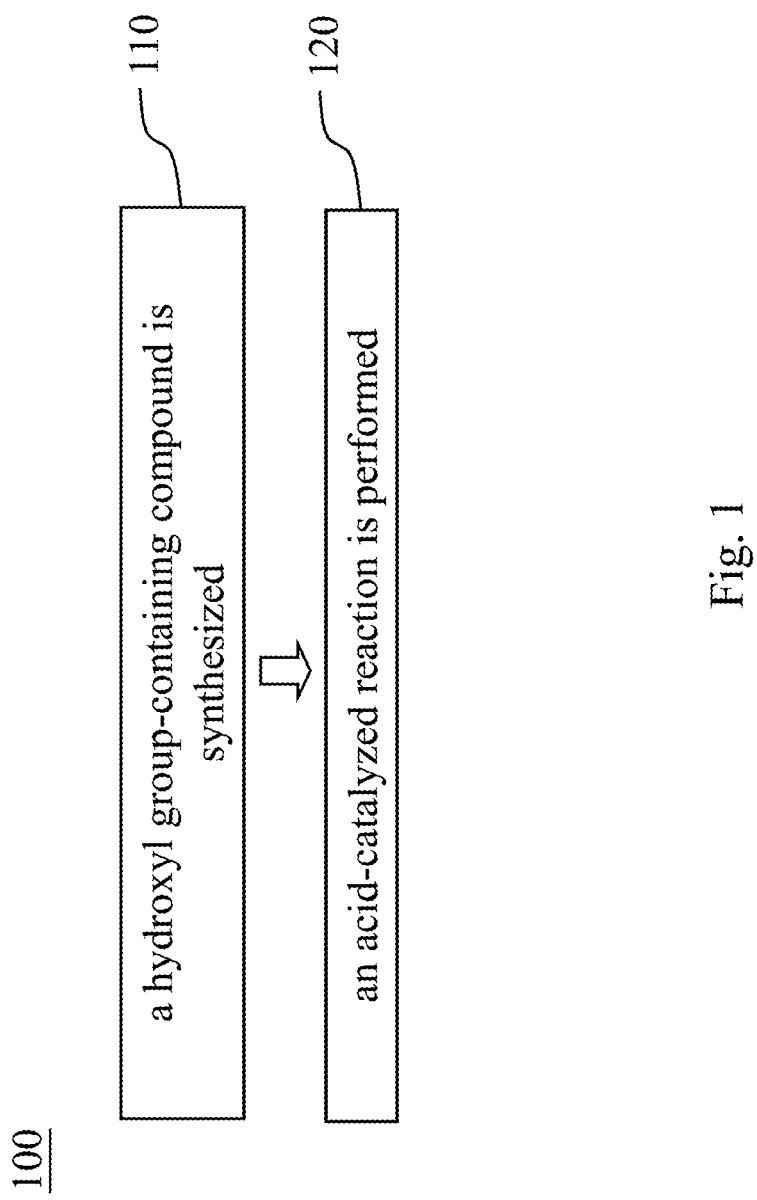
FIG. 1 is a flow chart of a manufacturing method for a phosphorus-containing compound according to one embodiment of the present disclosure.

In the present disclosure, when a group is described by "$C_x$", it indicates that the group has X carbon atoms.

In the present disclosure, the compound structure can be represented by a skeleton formula, and the representation can omit the carbon atom, the hydrogen atom and the carbon-hydrogen bond. In the case that the functional group is depicted clearly in the structural formula, the depicted one is preferred.

In the present disclosure, in order to concise and smooth, "phosphorus-containing compound includes a structure represented by formula (I)" can be represented as a phosphorus-containing compound represented by formula (I) or a phosphorus-containing compound (I) in some cases, and the other compounds or groups can be represented in the same manner.

A Phosphorus-Containing Compound

A phosphorus-containing compound is provided of the present disclosure, which includes a structure represented by formula (I):

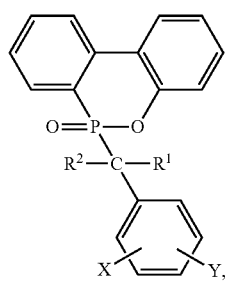

formula (I)

wherein $R^1$ and $R^2$ are each independently a hydrogen atom, an alkyl group of 1 to 6 carbon atoms, a trifluoromethyl group (—$CF_3$), an unsubstituted phenyl group, a substituted phenyl group, an unsubstituted naphthyl group or a substituted naphthyl group, X and Y are each independently —OH or a group represented by formula (MA):

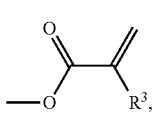

formula (MA)

wherein $R^3$ is the hydrogen atom or the alkyl group of 1 to 6 carbon atoms.

Therefore, the raw material used for the phosphorus-containing compound is low in cost, which is favorable for reducing the production cost to further expand the application range.

The aforementioned "a substituted phenyl group" means that the hydrogen on the phenyl group can be substituted by a monovalent organic group or a halogen atom. The monovalent organic group can be the alkyl group of 1 to 6 carbon atoms or the trifluoromethyl group. The halogen atom can be —F, —Cl, —Br.

The aforementioned "a substituted naphthyl group" means that the hydrogen on the naphthyl group can be substituted by the monovalent organic group or the halogen atom. The monovalent organic group can be the alkyl group of 1 to 6 carbon atoms or the trifluoromethyl group. The halogen atom can be —F, —Cl, —Br.

In formula (I), the relationship of X and Y can be an ortho relationship, a meta relationship or a para relationship.

Hereinafter, a group represented by formula (MA) is also referred to as a group (MA) or an acrylic functional group. When $R^3$ in formula (MA) is a methyl group, formula (MA) is called a group (MMA) or a methyl acrylic functional group.

For example, in formula (I), when $R^1$ is the methyl group, $R^2$ is the methyl group, X is —OH, Y is —OH, X and Y are in the meta relationship, the phosphorus-containing compound (IA-OH) can be obtained, and the name is 6-(2-(2,4-dihydroxyphenyl)propan-2-yl)-6H-dibenzo[c,e][1,2]oxaphosphinine 6-oxide. In formula (I), when $R^1$ is the methyl group, $R^2$ is the methyl group, X is —OH, Y is —OH, X and Y are in the ortho relationship, the phosphorus-containing compound (IB—OH) can be obtained, and the name is 6-(2-(3,4-dihydroxyphenyl)propan-2-yl)-6H-dibenzo[c,e][1,2]oxaphosphinine 6-oxide. In formula (I), when $R^1$ is the methyl group, $R^2$ is the phenyl group, X is —OH, Y is —OH, X and Y are in the meta relationship, the phosphorus-containing compound (IC—OH) can be obtained, and the name is 6-(1-(2,4-dihydroxyphenyl)-1-phenylethyl)-6H-dibenzo[c,e][1,2]oxaphosphinine 6-oxide. In formula (I), when $R^1$ is the methyl group, $R^2$ is the methyl group, X is formula (MA) and $R^3$ is the methyl group, Y is formula (MA) and $R^3$ is the methyl group, X and Y are in the meta relationship, and the phosphorus-containing compound (IA-MMA) can be obtained. In formula (I), when $R^1$ is the methyl group, $R^2$ is the methyl group, X is formula (MA) and $R^3$ is the methyl group, Y is formula (MA) and $R^3$ is the methyl group, X and Y are in the ortho relationship, and the phosphorus-containing compound (IB-MMA) can be obtained. In formula (I), when $R^1$ is the methyl group, $R^2$ is the phenyl group, X is formula (MA) and $R^3$ is the methyl group, Y is formula (MA) and $R^3$ is the methyl group, X and Y are in the meta relationship, and the phosphorus-containing compound (IC-MMA) can be obtained. The structure represented by formula (IA-OH), formula (IB—OH), formula (IC—OH), formula (IA-MMA), formula (IB-MMA) or formula (IC-MMA):

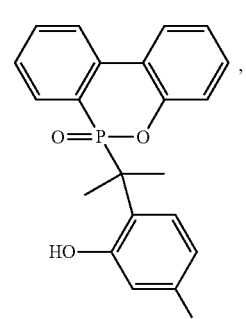

formula (IA-OH)

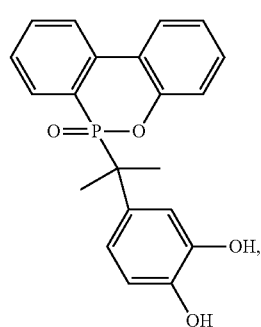

formula (IB-OH)

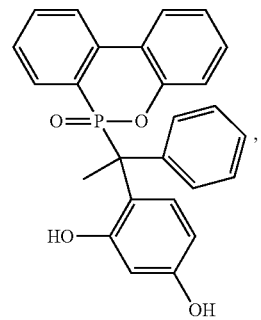

formula (IC-OH)

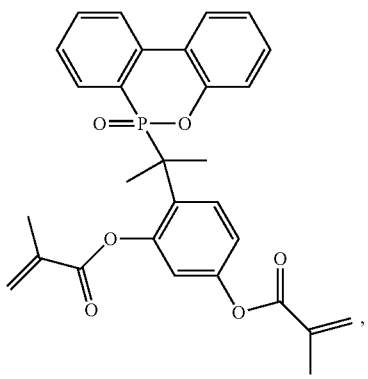

formula (IA-MMA)

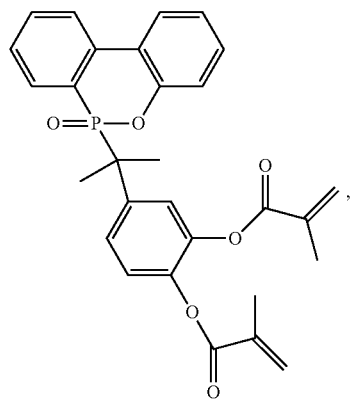

formula (IB-MMA)

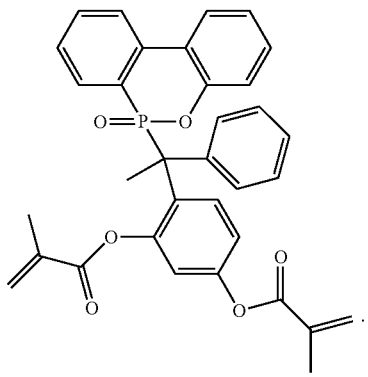

formula (IC-MMA)

A Manufacturing Method for a Phosphorus-Containing Compound

Please refer to FIG. 1, which is a flow chart of a manufacturing method for a phosphorus-containing compound 100 according to one embodiment of the present disclosure. Specifically, the manufacturing method for the phosphorus-containing compound 100 can be used to prepare a phosphorus-containing compound (I—OH) having a phenolic group. In FIG. 1, the manufacturing method for the phosphorus-containing compound 100 includes a step 110 and a step 120.

In the step 110, a hydroxyl group-containing compound is synthesized, wherein an organic phosphorus-containing compound represented by formula (i) is reacted with a carbonyl group-containing compound represented by formula (ii) to obtain a hydroxyl group-containing compound represented by formula (iii):

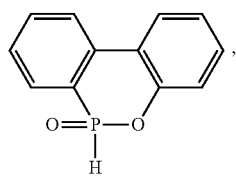

formula (i)

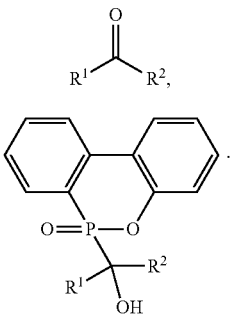

formula (ii)

formula (iii)

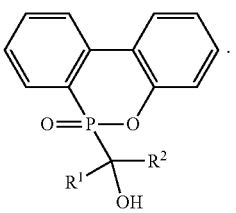

The step 110 can be performed at a temperature of 50° C. to 100° C. for 2 hours to 6 hours.

In the step 120, an acid-catalyzed reaction is performed, wherein the hydroxyl group-containing compound represented by formula (iii) is reacted with benzenediol at a catalysis of an acid catalyst to obtain the phosphorus-containing compound represented by formula (I—OH):

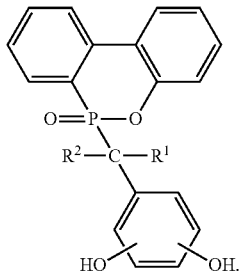

formula (I-OH)

The definition of $R^1$ and $R^2$ can refer to the aforementioned paragraph, and will not be described herein. The step 120 can be performed at the temperature of 80° C. to 130° C. for 1 hour to 24 hours.

The aforementioned acid catalyst can be acetic acid, methanesulfonic acid, oxalic acid, sulfuric acid, p-toluenesulfonic acid or a mixture thereof.

The reaction scheme of the manufacturing method for the phosphorus-containing compound 100 is shown in Table 1.

TABLE 1

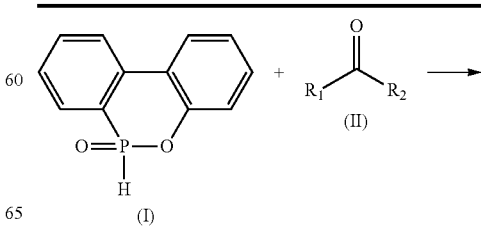

TABLE 1-continued

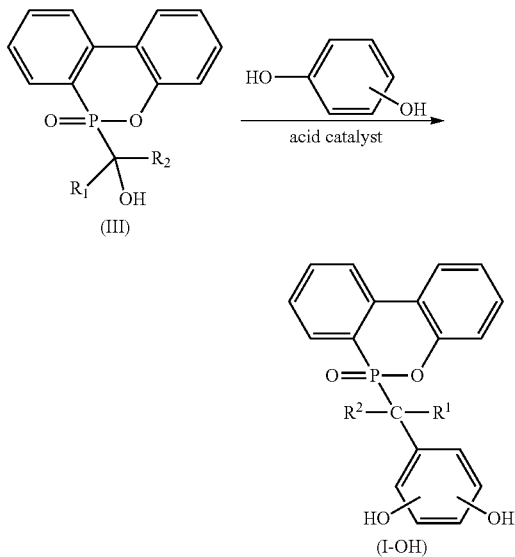

Figure 2:
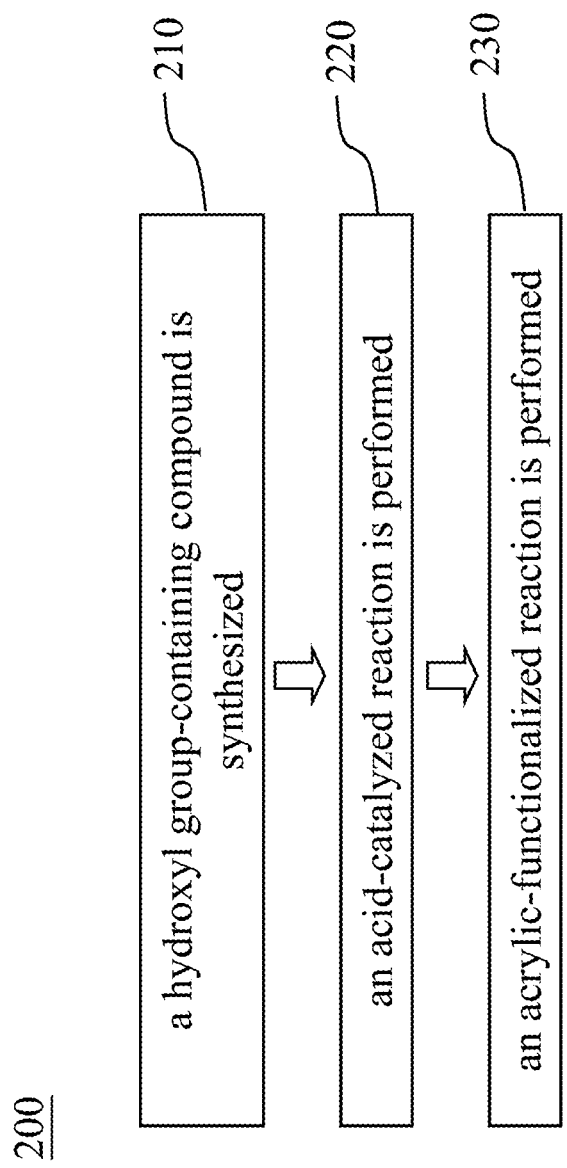
FIG. 2 is a flow chart of a manufacturing method for a phosphorus-containing compound according to another embodiment of the present disclosure.

Please refer to FIG. 2, which is a flow chart of a manufacturing method for a phosphorus-containing compound 200 according to another embodiment of the present disclosure. Specifically, the manufacturing method for the phosphorus-containing compound 200 can be used to prepare a phosphorus-containing compound (I-MA) having an acrylic functional group. In FIG. 2, the manufacturing method for the phosphorus-containing compound 200 includes a step 210, a step 220 and a step 230.

The step 210 is for synthesizing a hydroxyl group-containing compound, the step 220 is for performing an acid-catalyzed reaction. The step 210 and the step 220 can be the same as the step 110 and the step 120 of FIG. 1, respectively, and will not be described herein.

In the step 230, an acrylic-functionalized reaction is performed, wherein the phosphorus-containing compound represented by formula (I—OH) is reacted with an acrylic anhydride compound represented by formula (iv) to obtain the phosphorus-containing compound represented by formula (I-MA):

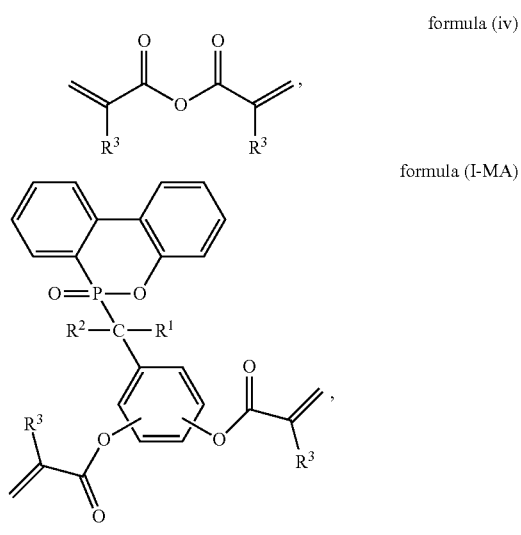

The definition of $R^1$, $R^2$ and $R^3$ can refer to the aforementioned paragraph, and will not be described herein. The step 230 can be performed at the temperature of 25° C. to 125° C. for 2 hours to 26 hours. In addition, the step 230 can add a catalyst, and the usable catalyst includes but not limited to 4-dimethylaminopyridine (DMAP). The reaction scheme of the step 230 is shown in Table 2.

TABLE 2

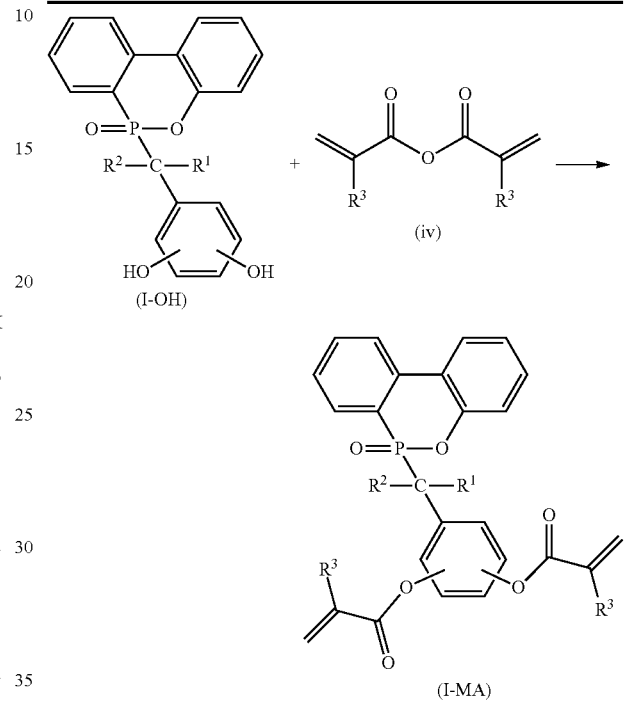

Figure 3:
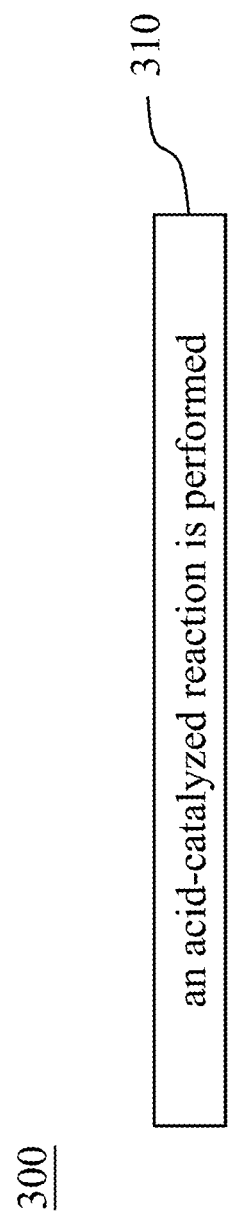
FIG. 3 is a flow chart of a manufacturing method for a phosphorus-containing compound according to further another embodiment of the present disclosure.

Please refer to FIG. 3, which is a flow chart of a manufacturing method for a phosphorus-containing compound 300 according to further another embodiment of the present disclosure. Specifically, the manufacturing method for the phosphorus-containing compound 300 can be used to prepare a phosphorus-containing compound (I—OH) having a phenolic group. In FIG. 3, the manufacturing method for the phosphorus-containing compound 300 includes a step 310.

In the step 310, an acid-catalyzed reaction is performed, wherein an organic phosphorus-containing compound represented by formula (i) and a carbonyl group-containing compound represented by formula (ii) are reacted with benzenediol at a catalysis of an acid catalyst to obtain a phosphorus-containing compound represented by formula (I—OH):

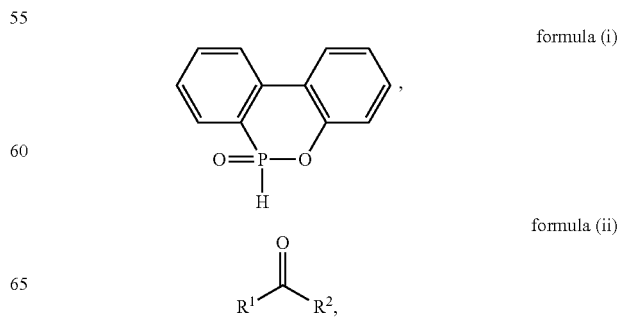

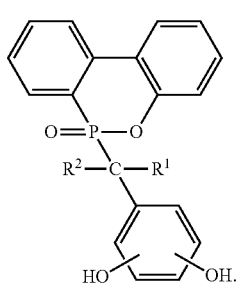

formula (I-OH)

The definition of $R^1$, $R^2$ and the usable acid catalyst can refer to the aforementioned paragraph, and will not be described herein. The step 310 can be performed at the temperature of 80° C. to 130° C. for 1 hour to 24 hours.

The reaction scheme of the manufacturing method for the phosphorus-containing compound 300 is shown in Table 3.

TABLE 3

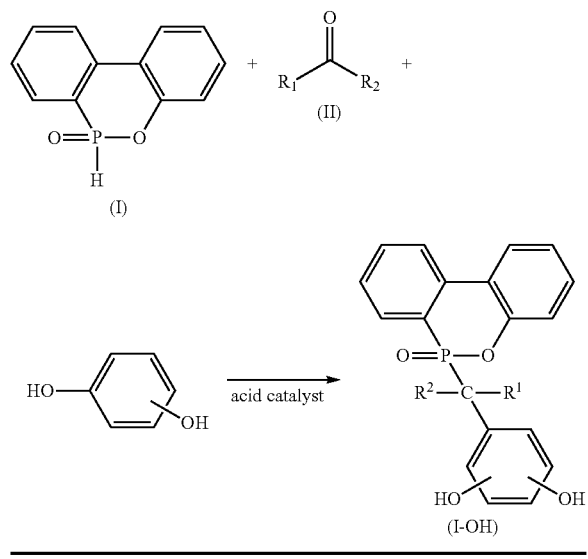

Figure 4:
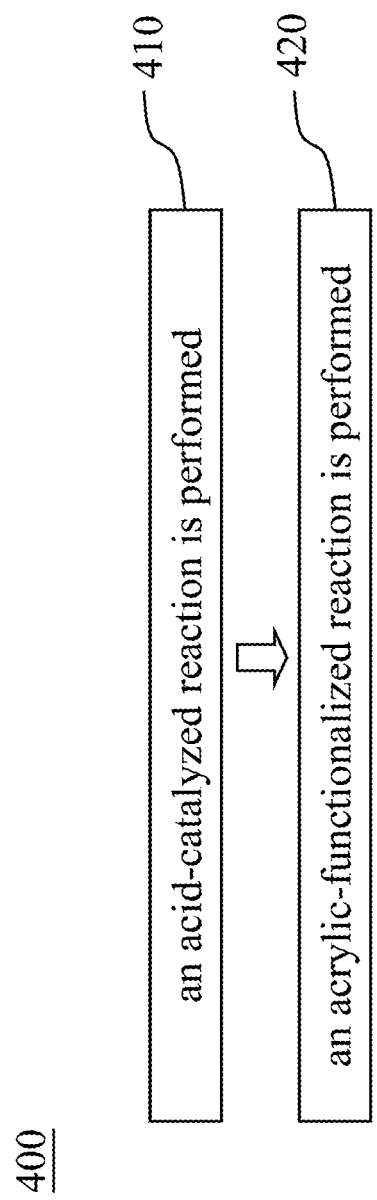
FIG. 4 is a flow chart of a manufacturing method for a phosphorus-containing compound according to still another embodiment of the present disclosure.

Please refer to FIG. 4, which is a flow chart of a manufacturing method for a phosphorus-containing compound 400 according to still another embodiment of the present disclosure. Specifically, the manufacturing method for the phosphorus-containing compound 400 can be used to prepare a phosphorus-containing compound (I-MA) having an acrylic functional group. In FIG. 4, the manufacturing method for the phosphorus-containing compound 400 includes a step 410 and a step 420.

The step 410 is for performing an acid-catalyzed reaction, the step 420 is for performing an acrylic-functionalized reaction. The step 410 can be the same as the step 310 of FIG. 3. The step 420 can be the same as the step 230 of FIG. 2, and will not be described herein.

As the aforementioned paragraph, the phosphorus-containing compound (I—OH) having a phenolic group of the present disclosure can be prepared by a two-step method (the manufacturing method for the phosphorus-containing compound 100 of FIG. 1) or a one-step method (the manufacturing method for the phosphorus-containing compound 300 of FIG. 3).

A Flame-Retardant Thermoset

A flame-retardant thermoset is provided of the present disclosure, which is made by the aforementioned phosphorus-containing compound.

For example, the phosphorus-containing compound of the present disclosure can be added to the composition of the thermoset by the physical blending method, so as the final product has the flame retardant properties, that is, the final product is the flame-retardant thermoset. Another example, the phosphorus-containing compound (I—OH) having a phenolic group can be used as a curing agent for an epoxy resin, that is, the phosphorus-containing compound (I—OH) having the phenolic group can be copolymerized with the epoxy resin to obtain the flame-retardant thermoset.

Further example, when the phosphorus-containing compound includes a structure represented by formula (I-MA), the flame-retardant thermoset can be obtained by copolymerizing the phosphorus-containing compound (I-MA) with an unsaturated resin. The structure of the phosphorus-containing compound (I-MA) can refer to the aforementioned paragraph. The unsaturated resin refers to a resin having an unsaturated bond (e.g. a double bond), and the unsaturated bond of the resin can be formed an addition reaction with a terminal double bond of the phosphorus-containing compound (I-MA) to copolymerize (hereinafter referred to as the addition polymerization). The unsaturated resin can be but is not limited to an acrylic resin or a methyl acrylic resin. The addition polymerization can be performed under the light conditions, and a radical initiator can be added according to the actual demand. The radical initiator can be but is not limited to 2, 2-azobis(2-methylpropionitrile) (AIBN) or tert-butyl cumyl peroxide (TBCP). The use of the radical initiator to make the double bond open to copolymerize is a conventional technique, and will not be described herein.

Still further example, when the phosphorus-containing compound includes the structure represented by formula (I-MA), the flame-retardant thermoset can be obtained by copolymerizing the phosphorus-containing compound (I-MA) with an epoxy resin. At this time, the ester group on the acrylic functional group of the phosphorus-containing compound (I-MA) can be copolymerized with the epoxy group of the epoxy resin (hereinafter referred to as the ring opening polymerization). The epoxy resin can be but is not limited to diglycidyl ether of bisphenol A, phenol novolac epoxy, cresol novolac epoxy, dicyclopentadiene-phenol epoxy, naphthalene-containing epoxy or a mixture thereof. That is, the aforementioned epoxy resin can be used singly or two or more kinds simultaneously, and when two or more kinds are used, it can be mixed in any ratio. Therefore, the flame-retardant thermoset can have the desired properties by selecting the appropriate epoxy resin. The ring opening polymerization can add the catalyst according to the actual demand. The catalyst can include the unshared electron pair. For example, the catalyst can be 4-dimethylaminopyridine, imidazole, 4-methylimidazole, 2-methylimidazole, or triphenylphosphine. The amount of the catalyst added can range from 0.1 wt % to 5 wt % of the epoxy resin content. Furthermore, a peroxide initiator can be added during the ring opening polymerization simultaneously. Accordingly, the phosphorus-containing compound (I-MA) can be further formed the self-addition polymerization by the terminal double bond, and the crosslinked structure of the flame-retardant thermoset can be more closer so as to improve the thermal stability. The peroxide initiator can be di-tert-butyl peroxide (DTBP), benzoyl peroxide (BPO), tert-butyl hydroperoxide (TBHP), or tert-butyl cumyl peroxide (TBCP). The amount of the peroxide initiator added can range from 0.1 wt % to 5 wt % of the phosphorus-containing compound (I-MA) content.

SYNTHESIS EXAMPLE AND EXAMPLE

Synthesis Example 1

A synthesis of a hydroxyl group-containing compound (iii-1). 10 g of an organic phosphorus-containing compound (i) and 50 g of acetone (ii-1) are placed in a 250 mL three-necked flask to stir, and nitrogen is passed through, so as to react at 50° C. for 6 hours to obtain a white precipitate. The white precipitate is dried to obtain the synthesis of the hydroxyl group-containing compound (iii-1). The reaction scheme of Synthesis Example 1 is shown below.

The reaction scheme of Synthesis Example 1

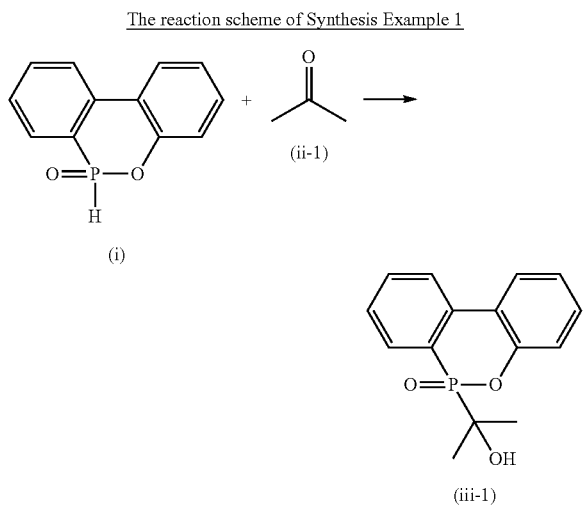

Example 1

A synthesis of a phosphorus-containing compound (IA-OH). 10 g (0.0365 mole) of the hydroxyl group-containing compound (iii-1), 20.1 g of resorcin and 0.4 g of p-toluenesulfonic acid are placed in a reactor, and reacted at 90° C. for 1.5 hours. Next, the reactor is cooled to the room temperature, methanol/water (the volume ratio is 1/1) is poured into the reactor to precipitate, and the product is obtained by filtrating and drying. The yield of the product is 82%. The reaction scheme of Example 1 is shown below.

The reaction of scheme of Example 1

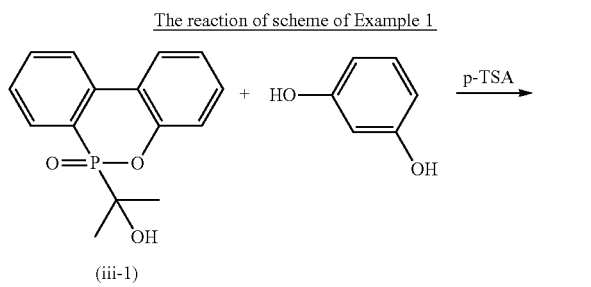

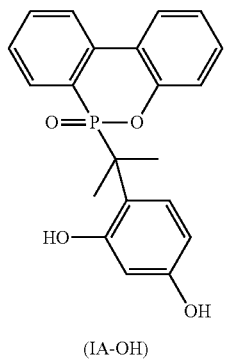

Figure 5:
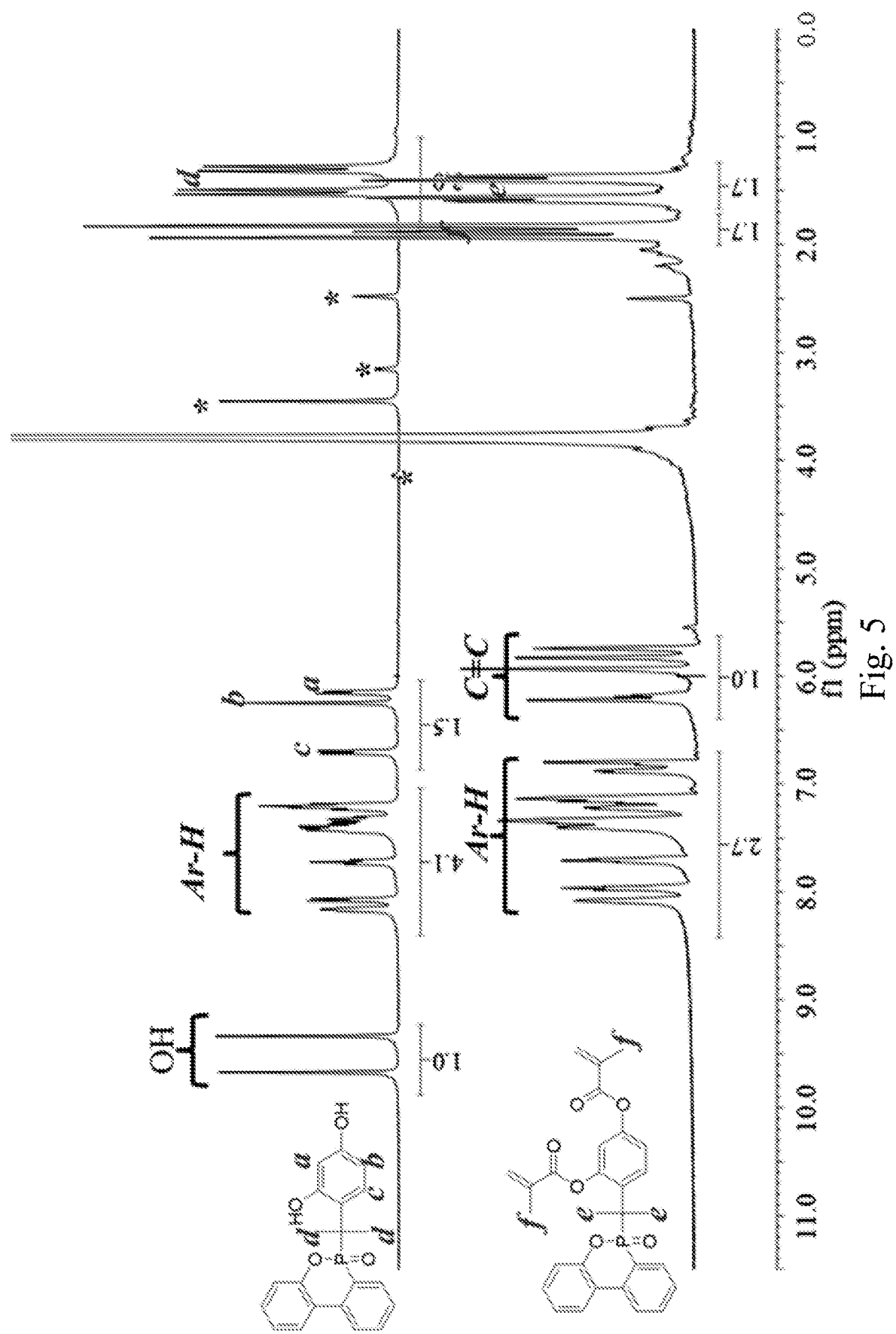
FIG. 5 is a $^1$H NMR spectrum of Example 1 and Example 4.

Please refer to FIG. 5, which is a $^1$H NMR spectrum of Example 1 and Example 4. The upper half is the $^1$H NMR spectrum of Example 1, and the lower half is the $^1$H NMR spectrum of Example 4, all of which are obtained by analyzing in the DMSO-$d_6$ solution. As known in FIG. 5, the product of Example 1 is the phosphorus-containing compound (IA-OH).

Example 2

A synthesis of a phosphorus-containing compound (IB—OH). 10 g (0.0365 mole) of the hydroxyl group-containing compound (iii-1), 20.1 g of catechol and 0.4 g of p-toluenesulfonic acid are placed in the reactor, and reacted at 120° C. for 12 hours. Next, the reactor is cooled to the room temperature, methanol/water (the volume ratio is 1/1) is poured into the reactor to precipitate, and the product is obtained by filtrating and drying. The yield of the product is 80%. The reaction scheme of Example 2 is shown below.

The reaction scheme of Example 2

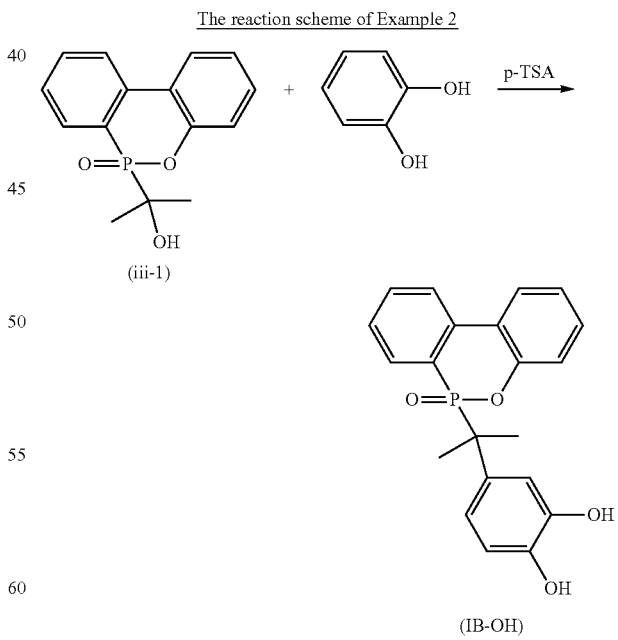

Figure 6:
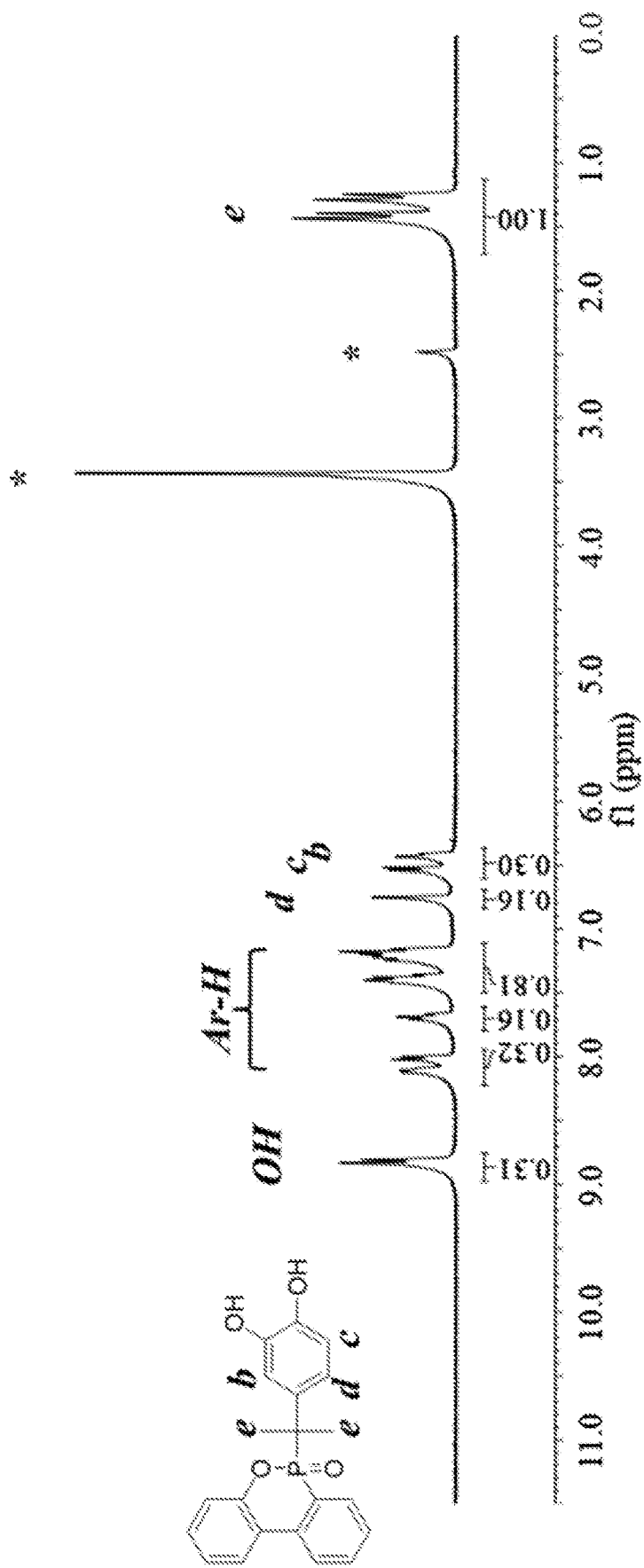
FIG. 6 is a $^1$H NMR spectrum of Example 2.

Please refer to FIG. 6, which is a $^1$H NMR spectrum of Example 2, and is obtained by analyzing in the DMSO-$d_6$ solution. As known in FIG. 6, the product of Example 2 is the phosphorus-containing compound (IB—OH).

Example 3

A synthesis of a phosphorus-containing compound (IC—OH). 2 g of the organic phosphorus-containing compound (i), 1.11 g of acetophenone (ii-2), 5.09 g of resorcin and 0.08 g of p-toluenesulfonic acid are placed in the reactor, and reacted at 105° C. for 24 hours. Next, the reactor is cooled to the room temperature, methanol/water (the volume ratio is 1/1) is poured into the reactor to precipitate, and the phosphorus-containing compound (IC—OH) is obtained by filtrating and drying. The yield of the product is 86%. The reaction scheme of Example 3 is shown below.

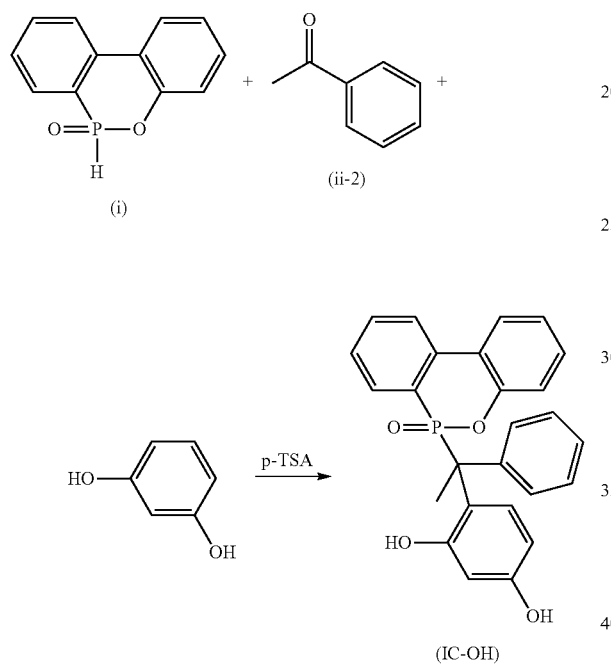

Example 4

A synthesis of a phosphorus-containing compound (IA-MMA). 10 g (2.73 mmole) of the phosphorus-containing compound (IA-OH), 16.84 g of methacrylic anhydride (iv-1), 0.267 g of 4-dimethylaminopyridine and 100 mL of dimethylformamide are placed in a 500 mL three-necked flask to stir, nitrogen is passed through and heated to 45° C. for 24 hours. After the reaction, water is poured into the three-necked flask to precipitate, and a crude product is obtained by washing with water several times. Next, the crude product is dissolved in dichloromethane and extracted with 1 N sodium hydroxide solution to remove dichloromethane, then dried to obtain the product. Please refer to FIG. 5, the lower half is the $^1$H NMR spectrum of Example 4. As known in FIG. 5, the product of Example 4 is the phosphorus-containing compound (IA-MMA). The reaction scheme of Example 4 is shown below.

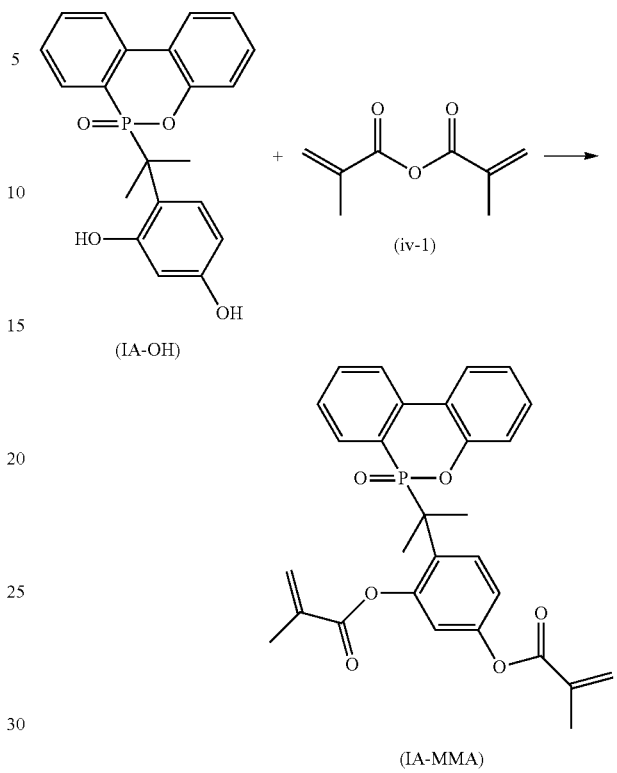

Example 5

A synthesis of a phosphorus-containing compound (IB-MMA). 10 g (2.73 mmole) of the phosphorus-containing compound (IB—OH), 16.84 g of methacrylic anhydride (iv-1), 0.267 g of 4-dimethylaminopyridine and 100 mL of dimethylformamide are placed in the 500 mL three-necked flask to stir, nitrogen is passed through and heated to 45° C. for 24 hours. After the reaction, water is poured into the three-necked flask to precipitate, and the crude product is obtained by washing with water several times. Next, the crude product is dissolved in dichloromethane and extracted with 1 N sodium hydroxide solution to remove dichloromethane, then dried to obtain the product. The reaction scheme of Example 5 is shown below.

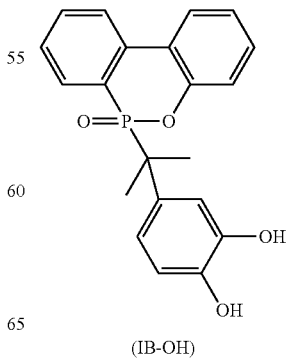

-continued

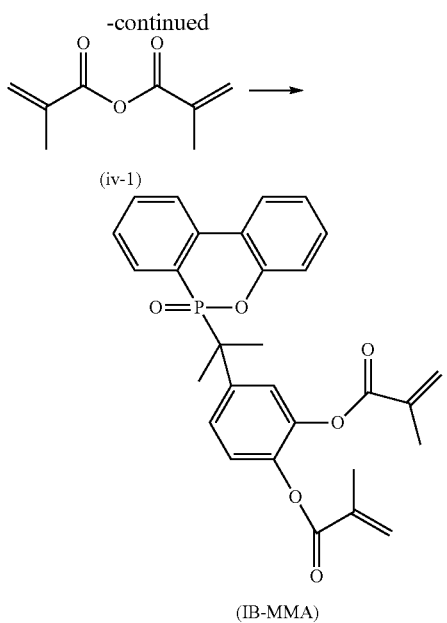

(IB-MMA)

Example 6

A preparation of a flame-retardant thermoset IA-MMA/HP7200. The phosphorus-containing compound (IA-MMA) is cured with a commercially epoxy resin HP-7200. The details are as follows: 5.17 g of the epoxy resin HP-7200 and 5.00 g of the phosphorus-containing compound (IA-MMA), wherein the equivalent ratio of the epoxy group to methyl acrylic functional group is 1 to 1. A solid content of a solution is 40 wt % prepared by using N-methylpyrrolidone, and 25.85 g of 4-dimethylaminopyridine and 0.05 g of TBCP are added. Next, the solution is coated on the glass by using a glass coater, and the temperature is raised at 80° C. for 12 hours, at 180° C., 200° C., and 220° C. for 2 hours respectively to cure. After soaking in water and the mold release, the deep brown flame-retardant thermoset IA-MMA/HP-7200 is obtained.

Figure 7A:
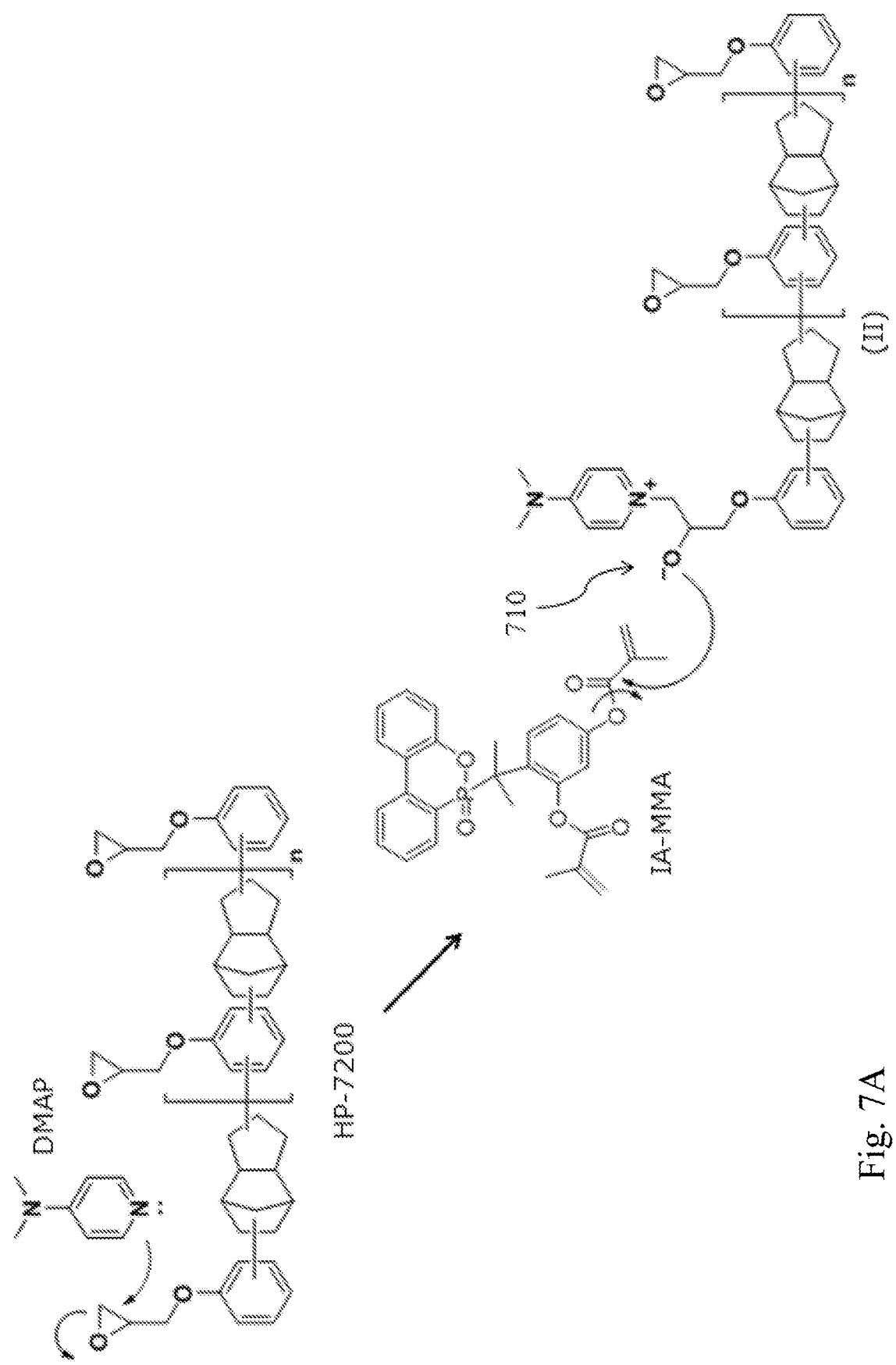
FIG. 7A is one of a reaction mechanism diagram of a ring-opening polymerization reaction of a flame-retardant thermoset IA-MMA/HP7200.
Figure 7B:
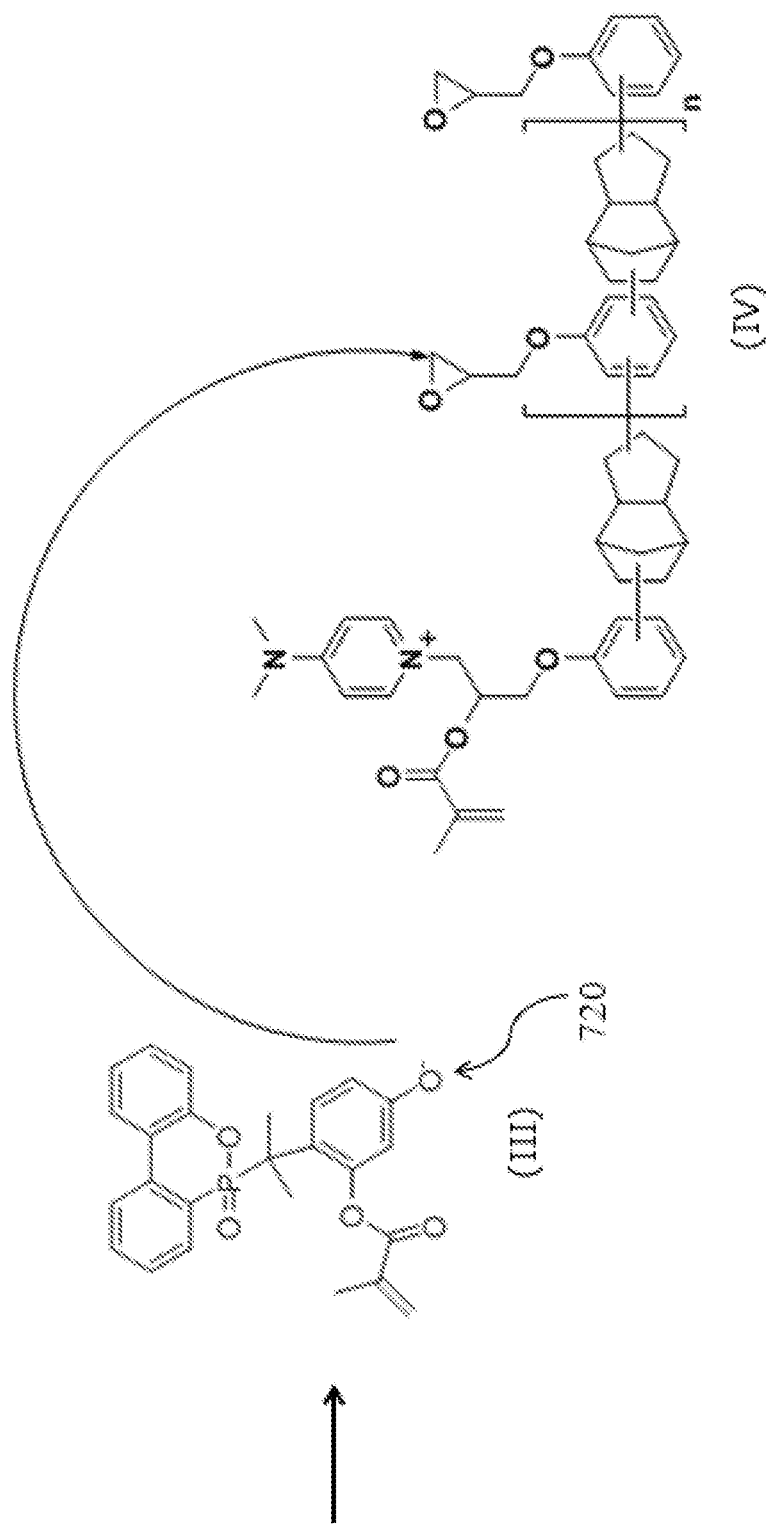
FIG. 7B is another of a reaction mechanism diagram of a ring-opening polymerization reaction of a flame-retardant thermoset IA-MMA/HP7200.

Please refer to FIGS. 7A and 7B, wherein FIG. 7A is one of a reaction mechanism diagram of a ring opening polymerization reaction of the flame-retardant thermoset IA-MMAIHP7200, and FIG. 7B is another of a reaction mechanism diagram of a ring opening polymerization reaction of the flame-retardant thermoset IA-MMA/HP7200. In FIG. 7A, the lone pair on nitrogen of the catalyst DMAP attacks the epoxy group of HP-7200, so as to open ring to form an intermediate product (II) with an alcohol negative 710. Next, the methyl acrylic functional group is performed a nucleophilic substitution reaction by the alcohol negative 710 of the intermediate product (II), as shown in FIG. 7B, an intermediate product (III) with a phenolic negative 720 and an intermediate product (IV) are formed. Then, the epoxy group of the intermediate product (IV) is performed a nucleophilic ring opening reaction by the phenolic negative 720, and the epoxy group can be opened to form an intermediate product (not shown) with the alcohol negative. Therefore, the ring opening polymerization reaction can be performed continually so as to cure. Furthermore, the phosphorus-containing compound (IA-MMA) has two methyl acrylic functional groups, and during the curing of the ring opening polymerization, the double bond can be polymerized by the peroxide initiator to form a closer network structure so as to improve the thermal properties effectively.

The flame-retardant thermoset IA-MMA/HP7200 of Example 6 is evaluated for the thermal properties, and the evaluation methods are as follows. The thermos-mechanical analysis (TMA) is used for measuring the glass transition temperature. The condition of the thermos-mechanical analysis is using the dynamic mechanical analyzer (DMA) (model: Perkin-Elmer Pyris Diamond) at a heating rate of 5° C./min to measure the glass transition temperature of the sample. The thermo-gravimetric analysis (TGA) is used for measuring the 5% thermogravimetric loss temperature of the sample and the Char yield of 800° C. The condition of the thermo-gravimetric analysis is using the thermogravimetric analyzer (model: Thermo Cahn Versa Therm) at the heating rate of 20° C./min under the nitrogen atmosphere to measure the weight change of the sample. The 5% thermogravimetric loss temperature refers to the temperature which the weight loss of the sample reaches 5%. The Char yield of 800° C. refers to the residual weight ratio of the sample at a heating temperature of 800° C.

Figure 8:
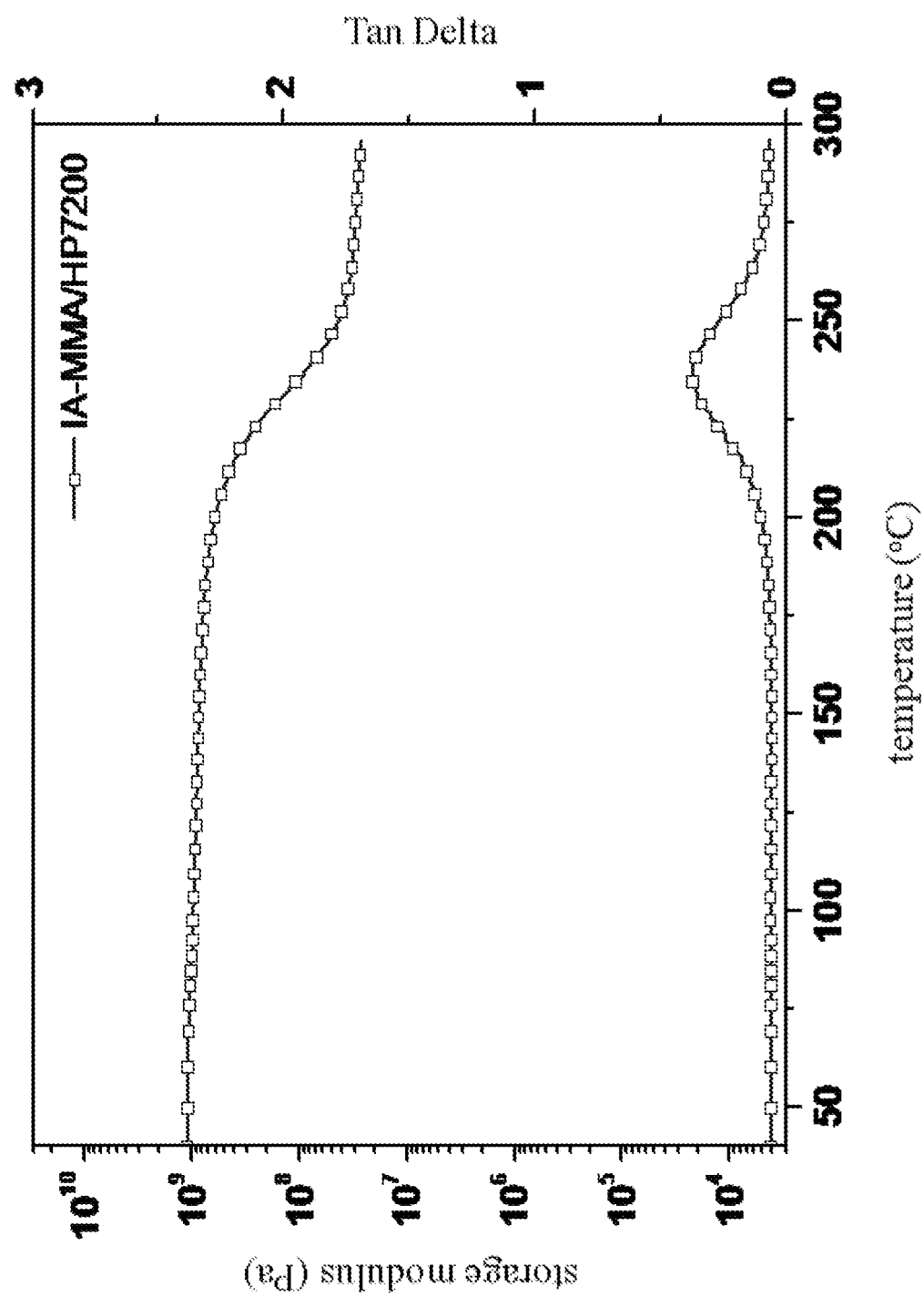
FIG. 8 is a diagram of dynamic mechanical analysis of the flame-retardant thermoset IA-MMA/HP7200.

Please refer to FIG. 8, which is a diagram of dynamic mechanical analysis of the flame-retardant thermoset IA-MMA/HP7200. As known in FIG. 8, the glass transition temperature of the flame-retardant thermoset IA-MMA/HP7200 is 235° C. The thermal stability of the material is analyzed by TGA, the 5% thermogravimetric loss temperature ($T_{d5}$%) of the flame-retardant thermoset IA-MMA/HP7200 is 405° C., and the Char yield of 800° C. is 16%. The aforementioned evaluation results show that the flame-retardant thermoset IA-MMA/HP7200 has excellent thermal properties.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A phosphorus-containing compound, comprising a structure represented by formula (I):

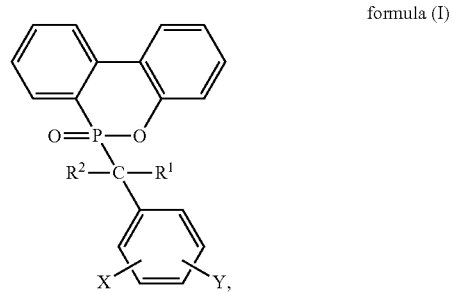

formula (I)

wherein $R^1$ and $R^2$ are each independently a hydrogen atom, an alkyl group of 1 to 6 carbon atoms, a trifluoromethyl group, an unsubstituted phenyl group, a substituted phenyl group, an unsubstituted naphthyl group or a substituted naphthyl group, wherein $R^1$ and $R^2$ are not the hydrogen at the same time, and the hydrogen on the phenyl group of the substituted phenyl group is substituted by a monovalent organic group, the hydrogen on the naphthyl group of the substituted naphthyl group is substituted by a monovalent organic group, and the monovalent organic group is the alkyl group of 1 to 6 carbon atoms, X and Y are each independently —OH or a group represented by formula (MA):

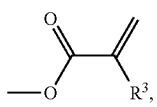

formula (MA)

wherein R³ is the hydrogen atom or the alkyl group of 1 to 6 carbon atoms.

2. The phosphorus-containing compound of claim 1, wherein the phosphorus-containing compound comprises a structure represented by formula (IA-OH), formula (IB—OH), formula (IC—OH), formula (IA-MMA), formula (IB-MMA) or formula (IC-MMA):

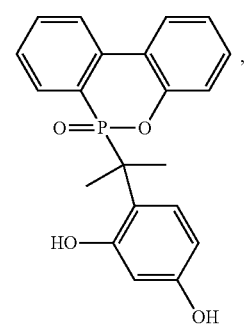

formula (IA-OH)

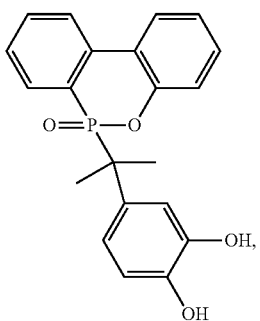

formula (IB-OH)

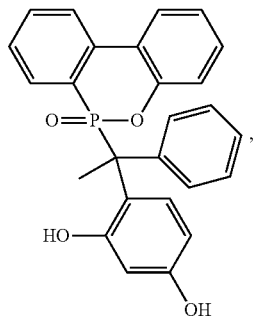

formula (IC-OH)

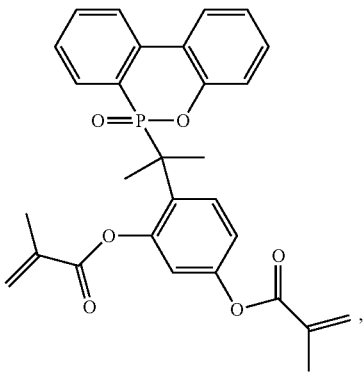

formula (IA-MMA)

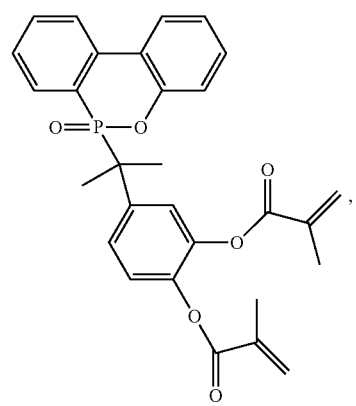

formula (IB-MMA)

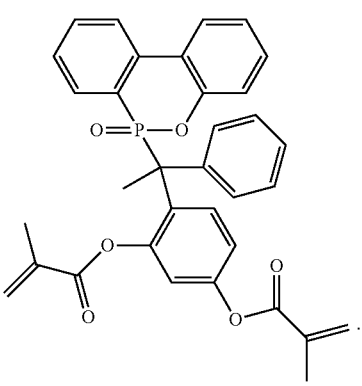

formula (IC-MMA)

3. A flame-retardant thermoset made by the phosphorus-containing compound of claim 1, wherein the flame-retardant thermoset is obtained by copolymerizing the phosphorus-containing compound with an unsaturated resin or an epoxy resin.

4. The flame-retardant thermoset of claim 3, wherein the phosphorus-containing compound comprises a structure represented by formula (I-MA):

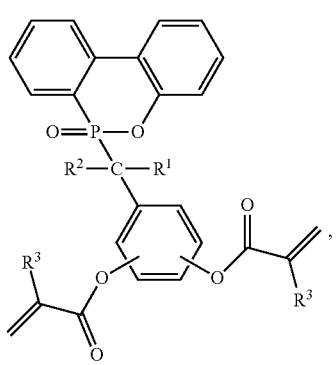

formula (I-MA)

wherein $R^1$ and $R^2$ are each independently the hydrogen atom, the alkyl group of 1 to 6 carbon atoms, the trifluoromethyl group, the unsubstituted phenyl group, the substituted phenyl group, the unsubstituted naphthyl group or the substituted naphthyl group, wherein $R^1$ and $R^2$ are not the hydrogen at the same time, and the hydrogen on the phenyl group of the substituted phenyl group is substituted by a monovalent organic group, the hydrogen on the naphthyl group of the substituted naphthyl group is substituted by a monovalent organic group, and the monovalent organic group is the alkyl group of 1 to 6 carbon atoms, $R^3$ is the hydrogen atom or the alkyl group of 1 to 6 carbon atoms.

5. A manufacturing method for a phosphorus-containing compound, comprising:

synthesizing a hydroxyl group-containing compound, wherein an organic phosphorus-containing compound represented by formula (i) is reacted with a carbonyl group-containing compound represented by formula (ii) to obtain a hydroxyl group-containing compound represented by formula (iii):

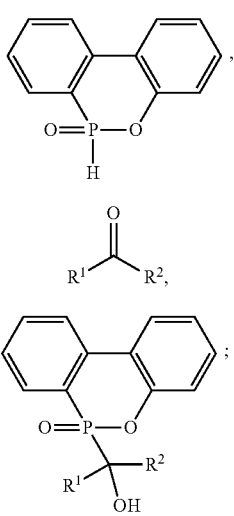

formula (i)

formula (ii)

formula (iii)

and performing an acid-catalyzed reaction, wherein the hydroxyl group-containing compound represented by formula (iii) is reacted with benzenediol at a catalysis of an acid catalyst to obtain a phosphorus-containing compound represented by formula (I—OH):

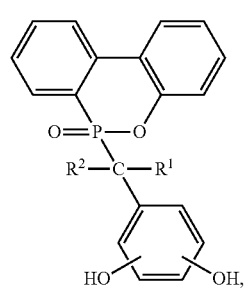

formula (I-OH)

wherein $R^1$ and $R^2$ are each independently a hydrogen atom, an alkyl group of 1 to 6 carbon atoms, a trifluoromethyl group, an unsubstituted phenyl group, a substituted phenyl group, an unsubstituted naphthyl group or a substituted naphthyl group, wherein $R^1$ and $R^2$ are not the hydrogen at the same time, and the hydrogen on the phenyl group of the substituted phenyl group is substituted by a monovalent organic group, the hydrogen on the naphthyl group of the substituted naphthyl group is substituted by a monovalent organic group, and the monovalent organic group is the alkyl group of 1 to 6 carbon atoms.

6. The manufacturing method for the phosphorus-containing compound of claim 5, further comprising:

performing an acrylic-functionalized reaction, wherein the phosphorus-containing compound represented by formula (I—OH) is reacted with an acrylic anhydride compound represented by formula (iv) to obtain a phosphorus-containing compound represented by formula (I-MA):

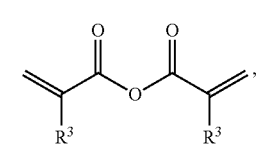

formula (iv)

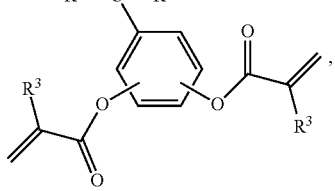

formula (I-MA)

wherein $R^1$ and $R^2$ are each independently the hydrogen atom, the alkyl group of 1 to 6 carbon atoms, the trifluoromethyl group, the unsubstituted phenyl group, the substituted phenyl group, the unsubstituted naphthyl group or the substituted naphthyl group, wherein $R^1$ and $R_2$ are not the hydrogen at the same time, and the hydrogen on the phenyl group of the substituted phenyl group is substituted by the monovalent organic group, the hydrogen on the naphthyl group of the substituted naphthyl group is substituted by the monovalent organic group, and the monovalent organic group is the alkyl group of 1 to 6 carbon atoms, $R^3$ is the hydrogen atom or the alkyl group of 1 to 6 carbon atoms.

7. The manufacturing method for the phosphorus-containing compound of claim 5, wherein the acid catalyst is acetic acid, methanesulfonic acid, oxalic acid, sulfuric acid, p-toluenesulfonic acid or a mixture thereof.

8. A manufacturing method for a phosphorus-containing compound, comprising:
    performing an acid-catalyzed reaction, wherein an organic phosphorus-containing compound represented by formula (i) and a carbonyl group-containing compound represented by formula (ii) are reacted with benzenediol at a catalysis of an acid catalyst to obtain a phosphorus-containing compound represented by formula (I—OH):

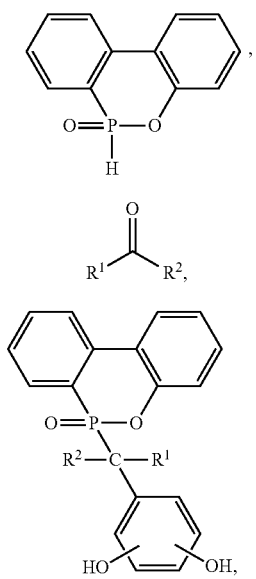

wherein $R^1$ and $R^2$ are each independently a hydrogen atom, an alkyl group of 1 to 6 carbon atoms, a trifluoromethyl group, an unsubstituted phenyl group, a substituted phenyl group, an unsubstituted naphthyl group or a substituted naphthyl group, wherein $R^1$ and $R^2$ are not the hydrogen at the same time, and the hydrogen on the phenyl group of the substituted phenyl group is substituted by a monovalent organic group, the hydrogen on the naphthyl group of the substituted naphthyl group is substituted by a monovalent organic group, and the monovalent organic group is the alkyl group of 1 to 6 carbon atoms.

9. The manufacturing method for the phosphorus-containing compound of claim 8, further comprising:
    performing an acrylic-functionalized reaction, wherein the phosphorus-containing compound represented by formula (I—OH) is reacted with an acrylic anhydride compound represented by formula (iv) to obtain a phosphorus-containing compound represented by formula (I-MA):

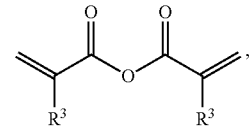

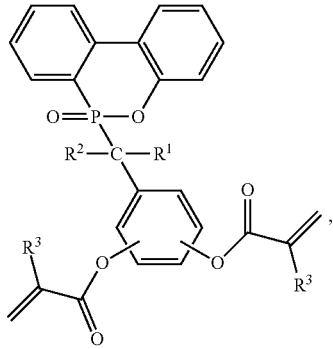

wherein $R^1$ and $R^2$ are each independently the hydrogen atom, the alkyl group of 1 to 6 carbon atoms, the trifluoromethyl group, the unsubstituted phenyl group, the substituted phenyl group, the unsubstituted naphthyl group or the substituted naphthyl group, wherein $R^1$ and $R^2$ are not the hydrogen at the same time, and the hydrogen on the phenyl group of the substituted phenyl group is substituted by the monovalent organic group, the hydrogen on the naphthyl group of the substituted naphthyl group is substituted by the monovalent organic group, and the monovalent organic group is the alkyl group of 1 to 6 carbon atoms, $R^3$ is the hydrogen atom or the alkyl group of 1 to 6 carbon atoms.

* * * * *